United States Patent [19]

Barth et al.

[11] Patent Number: 4,952,047
[45] Date of Patent: Aug. 28, 1990

[54] PROGRESSIVES BRILLENGLAS LENS WITH ADDITIONAL CHANNEL OF VISION

[75] Inventors: Rudolf Barth, Vierkirchen; Herbert Pfeiffer, Munich, both of Fed. Rep. of Germany

[73] Assignee: Optische Werke G. Rodenstock, Munich, Fed. Rep. of Germany

[21] Appl. No.: 221,253
[22] PCT Filed: Oct. 21, 1987
[86] PCT No.: PCT/DE87/00475
 § 371 Date: Jun. 20, 1988
 § 102(e) Date: Jun. 20, 1988
[87] PCT Pub. No.: WO88/03277
 PCT Pub. Date: May 5, 1988

[30] Foreign Application Priority Data

Oct. 21, 1986 [DE] Fed. Rep. of Germany ....... 3635777

[51] Int. Cl.$^5$ .............................................. G02C 7/06
[52] U.S. Cl. .................................................. 351/169
[58] Field of Search ............................... 351/168–172

[56] References Cited

U.S. PATENT DOCUMENTS 4,729,651 3/1988 Kitani ................................. 351/169

FOREIGN PATENT DOCUMENTS

| 39497 | 11/1981 | European Pat. Off. | ............ 351/169 |
| WO86/01308 | 2/1986 | European Pat. Off. | ............ 351/169 |
| 2584823 | 1/1987 | France | ................................. 351/169 |
| 2588672 | 4/1987 | France | ................................. 351/169 |
| 2100877 | 1/1983 | United Kingdom | ................ 351/169 |

Primary Examiner—Scott J. Sugarman
Attorney, Agent, or Firm—Antonelli, Terry, Stout & Kraus

[57] ABSTRACT

A progressive power ophthalmic lens having a convex front surface and a concave inner surface, of which at least one surface contributes to an increase in refractive power from a portion suited for distant vision via a progression zone to a portion suited for near vision along a plane or curved main meridian, along which the overall astigmatism is $\leq 0.5$ dpt.

The invented opthalmic lens is distinguished in that in order to form further channels of vision, the at least one surface contributing to increasing the refractive power is provided with at least one additional line which does not intersect the main meridian and runs from the distant portion to the bottom edge of the ophthalmic lens and on which the surface astigmatism has a minimum local value.

11 Claims, 7 Drawing Sheets

RADII OF CURVATURE IN HORIZONTAL INTERSECTIONS

X[mm] →

| Y[mm] | 0 | 2 | 4 | 6 | 8 | 10 | 12 | 14 | 16 | 18 | 20 | 22 | 24 | 26 | 28 |
|---|---|---|---|---|---|---|---|---|---|---|---|---|---|---|---|
| 30.0 | 89.553 | 89.482 | 89.317 | | | | | | | | | | | | |
| 28.0 | 90.204 | 90.135 | 89.975 | | | | | | | | | | | | |
| 26.0 | 90.804 | 90.738 | 90.584 | | | | | | | | | | | | |
| 24.0 | 91.354 | 91.292 | 91.145 | | | | | | | | | | | | |
| 22.0 | 91.854 | 91.796 | 91.659 | 89.173 | | | | | | | 89.875 | 89.800 | 90.460 | | |
| 20.0 | 92.300 | 92.248 | 92.127 | 89.833 | 89.150 | | | | 89.515 | 89.366 | 90.498 | 90.412 | 91.009 | 91.144 | 91.777 |
| 18.0 | 92.688 | 92.646 | 92.548 | 90.444 | 89.804 | 89.264 | 89.436 | 89.546 | 90.176 | 90.038 | 91.074 | 90.979 | 91.520 | 91.637 | 92.215 |
| 16.0 | 93.011 | 92.985 | 92.923 | 91.010 | 90.411 | 89.909 | 90.076 | 90.192 | 90.784 | 90.659 | 91.603 | 91.506 | 91.996 | 92.091 | 92.606 |
| 14.0 | 93.255 | 93.254 | 93.254 | 91.531 | 90.973 | 90.507 | 90.688 | 90.788 | 91.340 | 91.229 | 92.085 | 91.993 | 92.442 | 92.512 | 92.954 |
| 12.0 | 93.398 | 93.437 | 93.534 | 92.011 | 91.493 | 91.060 | 91.213 | 91.333 | 91.843 | 91.747 | 92.520 | 92.445 | 92.869 | 92.908 | 93.263 |
| 10.0 | 93.399 | 93.505 | 93.765 | 92.453 | 91.974 | 91.569 | 91.711 | 91.828 | 92.291 | 92.212 | 92.907 | 92.867 | 93.293 | 93.295 | 93.541 |
| 8.0 | 93.196 | 93.410 | 93.940 | 92.864 | 92.422 | 92.038 | 92.164 | 92.271 | 92.680 | 92.620 | 93.243 | 93.269 | 93.742 | 93.697 | 93.803 |
| 6.0 | 92.687 | 93.077 | 94.049 | 93.253 | 92.845 | 92.472 | 92.572 | 92.660 | 93.000 | 92.964 | 93.522 | 93.664 | 94.260 | 94.158 | 94.078 |
| 4.0 | 91.716 | 92.385 | 94.075 | 93.636 | 93.258 | 92.876 | 92.937 | 92.989 | 93.239 | 93.233 | 93.730 | 94.072 | 94.922 | 94.753 | 94.419 |
| 2.0 | 90.063 | 91.161 | 93.989 | 94.037 | 93.685 | 93.263 | 93.262 | 93.252 | 93.371 | 93.403 | 93.843 | 94.527 | 95.852 | 95.606 | 94.916 |
| 0.0 | 87.462 | 89.184 | 93.751 | 94.499 | 94.167 | 93.652 | 93.550 | 93.434 | 93.356 | 93.438 | 93.820 | 95.079 | 97.256 | 96.932 | 95.720 |
| -2.0 | 83.683 | 86.240 | 93.306 | 94.772 | 94.167 | 94.077 | 93.809 | 93.512 | 93.128 | 93.277 | 93.588 | 95.802 | 99.477 | 99.090 | 97.061 |
| -4.0 | 78.723 | 82.265 | 92.608 | 95.091 | 95.614 | 94.593 | 94.053 | 93.452 | 92.583 | 92.817 | 93.036 | 96.812 | 103.069 | 102.671 | 99.245 |
| -6.0 | 73.042 | 77.565 | 91.669 | 95.926 | 96.887 | 95.297 | 94.307 | 93.197 | 91.564 | 91.904 | 92.008 | 98.271 | 108.910 | 108.605 | 102.553 |
| -8.0 | 67.622 | 72.934 | 90.617 | 97.186 | 98.915 | 96.350 | 94.610 | 92.664 | 89.856 | 90.318 | 90.338 | 100.392 | 118.253 | 118.203 | 106.918 |
| -10.0 | 63.573 | 69.375 | 89.672 | 99.160 | 102.240 | 98.019 | 95.033 | 91.734 | 87.203 | 87.797 | 87.948 | 103.400 | 132.357 | 132.687 | 111.415 |
| -12.0 | 61.375 | 67.386 | 88.953 | 102.271 | 107.746 | 100.745 | 95.680 | 90.256 | 83.402 | 84.121 | 85.033 | 107.362 | 150.721 | 151.182 | 114.399 |
| -14.0 | 60.477 | 66.520 | 88.354 | 107.059 | 116.789 | 105.215 | 96.690 | 88.079 | 78.490 | 79.321 | 82.171 | 111.827 | 167.991 | 167.744 | 115.155 |
| -16.0 | 59.975 | 65.991 | 87.753 | 113.956 | 131.046 | 112.403 | 98.201 | 85.143 | 72.964 | 73.907 | 80.057 | 115.516 | 176.837 | 175.515 | 114.536 |
| -18.0 | 59.463 | 65.448 | 87.123 | 122.563 | 151.123 | 123.308 | 100.216 | 81.633 | 67.811 | 68.891 | 78.896 | 117.138 | 178.186 | 176.224 | 113.236 |
| -20.0 | 53.330 | 64.843 | 86.466 | 130.660 | 172.774 | 137.738 | 102.398 | 78.099 | 64.076 | 65.318 | 78.280 | 117.066 | 177.633 | 174.793 | 111.338 |
| -22.0 | 58.233 | 64.170 | 85.780 | 135.189 | 186.602 | 152.046 | 104.015 | 75.305 | 62.124 | 63.492 | 77.845 | 116.670 | 177.334 | 172.740 | 108.841 |
| -24.0 | 57.490 | 63.427 | 85.064 | 135.957 | 190.055 | 160.352 | 104.512 | 73.679 | 61.323 | 62.746 | 77.521 | 116.579 | 177.488 | 170.132 | 105.754 |
| -26.0 | 56.676 | 62.610 | 84.318 | 135.313 | 189.427 | 162.017 | 104.109 | 72.876 | 60.811 | 62.289 | 77.315 | 116.891 | 178.072 | 166.888 | |
| -28.0 | 55.778 | 61.718 | 83.541 | 134.560 | 188.290 | 161.106 | 103.276 | 72.243 | 60.247 | 61.843 | 77.238 | 117.642 | 179.034 | 162.904 | |
| -30.0 | 54.793 | 60.745 | 82.733 | 133.900 | 187.471 | 159.687 | 102.168 | 71.481 | 59.588 | 61.379 | 77.313 | 118.882 | 180.284 | | |
| | | | | | 186.687 | 158.022 | 100.793 | 70.546 | 58.832 | 60.901 | 77.566 | 120.682 | | | |
| | | | | | 186.037 | 156.105 | 99.146 | 69.437 | 57.983 | 60.413 | 78.036 | 123.136 | | | |
| | | | | | 185.520 | 153.915 | 97.222 | 68.154 | 57.043 | 59.925 | | | | | |
| | | | | | 185.132 | 151.424 | 95.016 | 66.697 | 56.016 | 59.450 | | | | | |
| | | | | | 184.869 | 148.498 | 92.522 | 65.069 | 54.909 | 59.003 | | | | | |
| | | | | | | 145.396 | 89.736 | 63.272 | | | | | | | |

FIG. 2b

RADII OF CURVATURE IN HORIZONTAL INTERSECTIONS

| Y[mm] \ X[mm] | 0 | 2 | 4 | 6 | 8 | 10 | 12 | 14 | 16 | 18 | 20 | 22 | 24 | 26 | 28 |
|---|---|---|---|---|---|---|---|---|---|---|---|---|---|---|---|
| 30.0 | 89.556 | 89.516 | 89.406 | 89.258 | 89.114 | 89.014 | 88.986 | 89.040 | 89.160 | 89.314 | | | | | |
| 28.0 | 90.207 | 90.167 | 90.058 | 89.911 | 89.767 | 89.667 | 89.638 | 89.690 | 89.808 | 89.960 | 90.102 | 90.192 | | | |
| 26.0 | 90.807 | 90.768 | 90.660 | 90.515 | 90.372 | 90.272 | 90.243 | 90.292 | 90.408 | 90.558 | 90.700 | 90.790 | 90.803 | | |
| 24.0 | 91.357 | 91.318 | 91.213 | 91.071 | 90.931 | 90.832 | 90.802 | 90.849 | 90.962 | 91.109 | 91.249 | 91.340 | 91.355 | 91.288 | |
| 22.0 | 91.856 | 91.819 | 91.717 | 91.580 | 91.445 | 91.349 | 91.318 | 91.363 | 91.471 | 91.613 | 91.749 | 91.839 | 91.856 | 91.793 | 91.668 |
| 20.0 | 92.301 | 92.267 | 92.172 | 92.043 | 91.916 | 91.825 | 91.796 | 91.837 | 91.938 | 92.071 | 92.200 | 92.286 | 92.304 | 92.247 | 92.130 |
| 18.0 | 92.689 | 92.659 | 92.575 | 92.462 | 92.349 | 92.267 | 92.240 | 92.275 | 92.364 | 92.483 | 92.599 | 92.678 | 92.697 | 92.648 | 92.543 |
| 16.0 | 93.012 | 92.989 | 92.924 | 92.836 | 92.748 | 92.683 | 92.659 | 92.684 | 92.753 | 92.847 | 92.941 | 93.008 | 93.027 | 92.991 | 92.908 |
| 14.0 | 93.256 | 93.244 | 93.212 | 93.168 | 93.121 | 93.085 | 93.068 | 93.077 | 93.111 | 93.163 | 93.219 | 93.265 | 93.284 | 93.269 | 93.221 |
| 12.0 | 93.397 | 93.406 | 93.430 | 93.459 | 93.484 | 93.496 | 93.491 | 93.472 | 93.447 | 93.427 | 93.419 | 93.428 | 93.447 | 93.468 | 93.480 |
| 10.0 | 93.397 | 93.441 | 93.558 | 93.713 | 93.860 | 93.954 | 93.968 | 93.900 | 93.774 | 93.632 | 93.517 | 93.464 | 93.485 | 93.568 | 93.681 |
| 8.0 | 93.192 | 93.293 | 93.567 | 93.935 | 94.288 | 94.522 | 94.567 | 94.414 | 94.115 | 93.765 | 93.470 | 93.316 | 93.342 | 93.532 | 93.818 |
| 6.0 | 92.687 | 92.875 | 93.410 | 94.134 | 94.837 | 95.307 | 95.404 | 95.102 | 94.505 | 93.804 | 93.212 | 92.895 | 92.935 | 93.305 | 93.883 |
| 4.0 | 91.701 | 92.052 | 93.013 | 94.327 | 95.618 | 96.491 | 96.670 | 96.105 | 94.997 | 93.709 | 92.631 | 92.059 | 92.131 | 92.806 | 93.870 |
| 2.0 | 90.039 | 90.630 | 92.265 | 94.540 | 96.818 | 98.380 | 98.691 | 97.657 | 95.671 | 93.412 | 91.562 | 90.602 | 90.743 | 91.915 | 93.775 |
| 0.0 | 87.425 | 88.369 | 91.025 | 94.818 | 98.734 | 101.482 | 102.010 | 100.130 | 96.638 | 92.808 | 89.779 | 88.262 | 88.533 | 90.485 | 93.614 |
| -2.0 | 83.629 | 85.051 | 89.140 | 95.225 | 101.822 | 106.631 | 107.518 | 104.090 | 98.035 | 91.753 | 87.034 | 84.783 | 85.276 | 88.370 | 93.433 |
| -4.0 | 78.650 | 80.638 | 86.536 | 95.836 | 106.686 | 115.112 | 116.608 | 110.312 | 99.979 | 90.098 | 83.187 | 80.080 | 80.900 | 85.511 | 93.336 |
| -6.0 | 72.953 | 75.504 | 83.359 | 96.691 | 113.889 | 128.585 | 131.131 | 119.558 | 102.445 | 87.797 | 78.426 | 74.486 | 75.708 | 82.077 | 93.488 |
| -8.0 | 67.524 | 70.521 | 80.106 | 97.707 | 123.260 | 148.025 | 152.287 | 131.672 | 105.030 | 85.059 | 73.448 | 68.877 | 70.505 | 78.588 | 94.073 |
| -10.0 | 63.472 | 66.743 | 77.520 | 98.661 | 132.869 | 170.557 | 176.940 | 143.849 | 106.826 | 82.365 | 69.264 | 64.389 | 66.382 | 75.860 | 95.219 |
| -12.0 | 61.275 | 64.681 | 76.100 | 99.404 | 139.782 | 188.127 | 195.462 | 151.109 | 106.910 | 80.126 | 66.520 | 61.707 | 64.085 | 74.626 | 97.050 |
| -14.0 | 60.377 | 63.860 | 75.627 | 100.064 | 143.616 | 197.001 | 202.782 | 152.039 | 105.306 | 78.259 | 64.934 | 60.513 | 63.432 | 74.992 | 99.829 |
| -16.0 | 59.878 | 63.431 | 75.494 | 100.796 | 146.459 | 202.101 | 204.558 | 149.894 | 102.812 | 76.414 | 63.742 | 59.930 | 63.593 | 76.400 | 103.730 |
| -18.0 | 59.369 | 63.000 | 75.387 | 101.626 | 149.531 | 207.143 | 205.249 | 146.870 | 99.935 | 74.432 | 62.545 | 59.454 | 64.018 | 78.365 | 108.722 |
| -20.0 | 58.791 | 62.507 | 75.254 | 102.567 | 153.094 | 212.839 | 205.550 | 143.320 | 96.775 | 72.307 | 61.288 | 59.006 | 64.623 | 80.838 | 114.934 |
| -22.0 | 58.138 | 61.947 | 75.099 | 103.650 | 157.276 | 219.329 | 205.369 | 139.229 | 93.348 | 70.052 | 59.987 | 58.611 | 65.460 | 83.963 | 122.722 |
| -24.0 | 57.408 | 61.320 | 74.927 | 104.914 | 162.243 | 226.742 | 204.543 | 134.569 | 89.668 | 67.685 | 58.664 | 58.305 | 66.616 | 87.967 | |
| -26.0 | 56.598 | 60.624 | 74.745 | 106.413 | 168.220 | 235.228 | 202.876 | 129.324 | 85.757 | 65.230 | 57.344 | 58.138 | 68.208 | | |
| -28.0 | 55.705 | 59.857 | 74.561 | 108.217 | 175.523 | 244.947 | 200.134 | 123.489 | 81.642 | 62.710 | 56.061 | 58.173 | | | |
| -30.0 | 54.724 | 59.016 | 74.387 | 110.422 | 184.609 | 256.055 | 196.053 | 117.080 | 77.356 | 60.157 | | | | | |

FIG. 3a

SAGITTA [mm]

| Y[mm] \ X[mm] | 0 | 2 | 4 | 6 | 8 | 10 | 12 | 14 | 16 | 18 | 20 | 22 | 24 | 26 | 28 | 30 | 32 | 34 | 36 |
|---|---|---|---|---|---|---|---|---|---|---|---|---|---|---|---|---|---|---|---|
| 30.0 | -4.9301 | -5.0024 | -5.0695 | -5.1815 | -5.3387 | -5.5412 | -5.7895 | -6.0837 | -6.4243 | -6.8118 | | | | | | | | | |
| 28.0 | -4.3277 | -4.3498 | -4.4164 | -4.5276 | -4.6836 | -4.8847 | -5.1311 | -5.4232 | -5.7612 | -6.1459 | -6.5777 | -7.0576 | | | | | | | |
| 26.0 | -3.7240 | -3.7460 | -3.8122 | -3.9226 | -4.0776 | -4.2773 | -4.5220 | -4.8121 | -5.1478 | -5.5298 | -5.9586 | -6.4351 | -6.9601 | | | | | | |
| 24.0 | -3.1680 | -3.1899 | -3.2557 | -3.3654 | -3.5195 | -3.7179 | -3.9612 | -4.2494 | -4.5831 | -4.9626 | -5.3887 | -5.8621 | -6.3836 | -6.9541 | | | | | |
| 22.0 | -2.6590 | -2.6808 | -2.7462 | -2.8553 | -3.0085 | -3.2058 | -3.4477 | -3.7343 | -4.0660 | -4.4434 | -4.8670 | -5.3376 | -5.8560 | -6.4231 | -7.0396 | | | | |
| 20.0 | -2.1961 | -2.2177 | -2.2828 | -2.3914 | -2.5438 | -2.7401 | -2.9807 | -3.2695 | -3.5959 | -3.9713 | -4.3927 | -4.8609 | -5.3765 | -5.9404 | -6.5535 | -7.2168 | | | |
| 18.0 | -1.7786 | -1.8001 | -1.8649 | -1.9731 | -2.1243 | -2.3202 | -2.5597 | -2.8435 | -3.1720 | -3.5457 | -3.9651 | -4.4310 | -4.9441 | -5.5053 | -6.1154 | -6.7753 | -7.0892 | | |
| 16.0 | -1.4059 | -1.4274 | -1.4920 | -1.5997 | -1.7508 | -1.9454 | -2.1839 | -2.4665 | -2.7937 | -3.1658 | -3.5835 | -4.0475 | -4.5584 | -5.1171 | -5.7245 | -6.3815 | -6.7396 | | |
| 14.0 | -1.0776 | -1.0990 | -1.1634 | -1.2708 | -1.4214 | -1.6153 | -2.1344 | -2.1344 | -2.4604 | -2.8312 | -3.2474 | -3.7097 | -4.2188 | -4.7753 | -5.3803 | -6.0347 | -6.7396 | | |
| 12.0 | -0.7932 | -0.8146 | -0.8789 | -0.9860 | -1.1361 | -1.3294 | -1.5662 | -1.8468 | -2.1717 | -2.5414 | -2.9564 | -3.4173 | -3.9247 | -4.4794 | -5.0823 | -5.7344 | -6.4369 | -7.1911 | |
| 10.0 | -0.5523 | -0.5737 | -0.6380 | -0.7450 | -0.8948 | -1.0875 | -1.3236 | -1.6033 | -1.9273 | -2.2961 | -2.7101 | -3.1699 | -3.6761 | -4.2292 | -4.8302 | -5.4893 | -6.1807 | -6.7329 | |
| 8.0 | -0.3548 | -0.3763 | -0.4406 | -0.5476 | -0.6972 | -0.8895 | -1.1248 | -1.4037 | -1.7269 | -2.0950 | -2.5084 | -2.9675 | -3.4726 | -4.0245 | -4.6239 | -5.2722 | -5.9709 | -6.7213 | |
| 6.0 | -0.2006 | -0.2222 | -0.2867 | -0.3940 | -0.5435 | -0.7354 | -0.9700 | -1.2480 | -1.5705 | -1.9380 | -2.3511 | -2.8100 | -3.3146 | -3.8648 | -4.4634 | -5.1101 | -5.8072 | -6.5565 | |
| 4.0 | -0.0898 | -0.1115 | -0.1766 | -0.2844 | -0.4341 | -0.6256 | -0.8593 | -1.1364 | -1.4581 | -1.8254 | -2.2387 | -2.6978 | -3.2024 | -3.7525 | -4.3491 | -4.9942 | -5.6900 | -6.4386 | -7.2412 |
| 2.0 | -0.0226 | -0.0448 | -0.1108 | -0.2196 | -0.3697 | -0.5609 | -0.7936 | -1.0694 | -1.3903 | -1.7576 | -2.1716 | -2.6318 | -3.1370 | -3.6867 | -4.2820 | -4.9253 | -5.6198 | -6.3632 | -7.1718 |
| 0.0 | -0.0000 | -0.0228 | -0.0904 | -0.2008 | -0.3519 | -0.5427 | -0.7739 | -1.0480 | -1.3677 | -1.7353 | -2.1510 | -2.6133 | -3.1200 | -3.6698 | -4.2636 | -4.9046 | -5.5976 | -6.3464 | -7.1524 |
| -2.0 | -0.0232 | -0.0470 | -0.1171 | -0.2302 | -0.3828 | -0.5731 | -0.8022 | -1.0737 | -1.3920 | -1.7603 | -2.1786 | -2.6445 | -3.1539 | -3.7041 | -4.2961 | -4.9343 | -5.6255 | -6.3752 | -7.1850 |
| -4.0 | 0.0943 | -0.1196 | -0.1933 | -0.3104 | -0.4652 | -0.6550 | -0.8812 | -1.1491 | -1.4654 | -1.8346 | -2.2570 | -2.7281 | -3.2416 | -3.7929 | -4.3827 | -5.0173 | -5.7062 | -6.4573 | -7.2727 |
| -6.0 | -0.2166 | -0.2437 | -0.3222 | -0.4445 | -0.6024 | -0.7916 | -1.0141 | -1.2775 | -1.5912 | -1.9618 | -2.3893 | -2.8673 | -3.3863 | -3.9393 | -4.5268 | -5.1573 | -5.8437 | -6.5963 | |
| -8.0 | -0.3940 | -0.4234 | -0.5072 | -0.6352 | -0.7966 | -0.9852 | -1.2039 | -1.4626 | -1.7738 | -2.1460 | -2.5793 | -3.0649 | -3.5900 | -4.1453 | -4.7310 | -5.3580 | -6.0427 | -6.7984 | |
| -10.0 | -0.6315 | -0.6626 | -0.7510 | -0.8841 | -1.0485 | -1.2370 | -1.4528 | -1.7081 | -2.0178 | -2.3919 | -2.8304 | -3.3227 | -3.8533 | -4.4113 | -4.9969 | -5.6228 | -6.3077 | -7.0670 | |
| -12.0 | -0.9331 | -0.9653 | -1.0564 | -1.1927 | -1.3592 | -1.5482 | -1.7632 | -2.0174 | -2.3272 | -2.7035 | -3.1460 | -3.6431 | -4.1782 | -4.7394 | -5.3271 | -5.9549 | -6.6426 | -7.4064 | |
| -14.0 | -1.3019 | -1.3346 | -1.4270 | -1.5647 | -1.7327 | -1.9227 | -2.1385 | -2.3937 | -2.7050 | -3.0837 | -3.5295 | -4.0305 | -4.5694 | -5.1344 | -5.7258 | -6.3575 | -7.0499 | | |
| -16.0 | -1.7398 | -1.7728 | -1.8659 | -2.0047 | -2.1739 | -2.3652 | -2.5824 | -2.8394 | -3.1530 | -3.5347 | -3.9839 | -4.4887 | -5.0137 | -5.6008 | -6.1966 | -6.8333 | -7.5315 | | |
| -18.0 | -2.2485 | -2.2817 | -2.3756 | -2.5155 | -2.6860 | -2.8787 | -3.0976 | -3.3567 | -3.6731 | -4.0581 | -4.5113 | -5.0204 | -5.5678 | -6.1414 | -6.7421 | -7.3844 | | | |
| -20.0 | -2.8296 | -2.8632 | -2.9580 | -3.0992 | -3.2710 | -3.4653 | -3.6860 | -3.9475 | -4.2670 | -4.6560 | -5.1138 | -5.6277 | -6.1800 | -6.7584 | -7.3645 | -8.0132 | | | |
| -22.0 | -3.4856 | -3.5195 | -3.6153 | -3.7579 | -3.9313 | -4.1273 | -4.3499 | -4.6140 | -4.9372 | -5.3308 | -5.7938 | -6.3131 | -6.8706 | -7.4543 | -8.0662 | | | | |
| -24.0 | -4.2188 | -4.2532 | -4.3501 | -4.4943 | -4.6694 | -4.8671 | -5.0920 | -5.3591 | -5.6863 | -6.0852 | -6.5542 | -7.0795 | -7.6427 | -8.2321 | | | | | |
| -26.0 | -5.0324 | -5.0673 | -5.1655 | -5.3114 | -5.4883 | -5.6880 | -5.9152 | -6.1857 | -6.5177 | -6.9225 | -7.3981 | -7.9301 | -8.4996 | | | | | | |
| -28.0 | -5.9298 | -5.9653 | -6.0650 | -6.2128 | -6.3917 | -6.5934 | -6.8233 | -7.0975 | -7.4349 | -7.8465 | -8.3297 | -8.8690 | | | | | | | |
| -30.0 | -6.9153 | -6.9513 | -7.527 | -7.2026 | -7.3837 | -7.5877 | -7.8204 | -8.0990 | -8.4424 | -8.8618 | | | | | | | | | |

PROGRESSIVES BRILLENGLAS LENS WITH ADDITIONAL CHANNEL OF VISION

DESCRIPTION

1. Background of the Invention

The present invention relates to a progressive power ophthalmic lens hereto in the introductory part of claim 1 hereto.

2. State of the Art

Progressive power ophthalmic lenses hereto in the introductory part of patent claim 1 hereto having a surface contributing to a progressive increase in refractive power, are known, by way of illustration from the DE-A No. 28 14 916, the DE-A No. 20 44 639 or the DE-A No. 30 16 935.

An ophthalmic lens having two surfaces contributing to a progressive increase in refractive power, is described in DE-A No. 34 30 334. Specific reference is made to the latter as well as to DE-A No. 28 14 916 with regard to all terms and further state of the art not expressly mentioned herein.

Particularly in the case of progressive power ophthalmic lenses having only one surface contributing to a progressive increase in refractive power, there frequently is detraction in wearer acceptance due to the so-called progressive channel, i.e. the region in which the power increases and which is suited for distant vision, and the portion for near vision are so narrow in the prior art progressive power ophthalmic lenses that they permit no overall view of large areas without head movement.

This is irritating, by way of illustration, when working at apparatuses with display screens and having to alternately glance at the information on the display screen and at files disposed beside the screen.

SUMMARY OF THE INVENTION

The primary object of the present invention is to improve a progressive power ophthalmic lens in such a manner that, in particular, looking at different areas and, especially, adjacent areas, is possible without moving the head.

According to the present invention, the progressive power surface has or in the case of an ophthalmic lens having two surfaces contributing to increasing the refractive power both surfaces have, in addition to the actual main meridian, lines on which the surface astigmatism has a minimum local value so low that there is more than one channel of vision for seeing in an approximately vertical direction.

Remarkably, a result was that the acceptance of progressive power ophthalmic lenses is increased substantially, more particularly, when different areas have to continually be glanced at, by providing the ophthalmic lenses with several channels of vision than is the case with an ophthalmic lens having a near portion and a progressive power channel maximally extended within the framework of the theoretically feasible with respect to the surface.

Most particularly surprising was that it is possible to "accommodate", on the limited surface of an ophthalmic lens, several channels of Vision suitable for distinct vision, the overall surface of which is greater than the surface of the portion suitable for distant vision in an ophthalmic lens of conventional design, i.e. having a progressive power channel and a near portion. An inventive element is, namely, that it was recognized that Minkwitz's law is only valid for a region surrounding an umbilical line or a quasi-umbilical line and thus the width of the progression zone as well as, if necessary, the portion for near vision is limited, but that, on the other hand, Minkwitz's law does not apply to distant areas so that it is possible to arrange several regions suitable for distinct vision side by side on an ophthalmic lens.

According to a feature of the present invention, it is especially advantageous, if at least one line is provided on the nasal side as well as on the temporal side of the main meridian, forming an additional channel of vision, whereby these lines do not have to run exactly parallel to the main meridian: on the contrary it is especially advantageous if that course of the lines is "adapted" to the up-down direction of the movement of the eyeball and the lines are formed on the nasal side and on the temporal side in such a manner that they make unencumbered binocular vision possible: whereby when the eyeballs move approximately in a vertical direction, the rays of vision for both eyes run simultaneously through the line forming channels of vision.

This means, in particular, that the lines forming the channels of vision divide the progressive power surface or surfaces into a series of different surface areas and that the surface does not have to run symmetrically to the main meridian:

By way of illustration, a progressive power surface is provided with a temporal and a nasal line, on which the surface astigmatism has a minimum local value, i.e. four different surface areas, namely, an inner nasal, an inner temporal, an outer nasal and an outer temporal area.

Furthermore, it is preferable if the surface astigmatism on the lateral lines is less than/equals 0.5 dpt or less than/equals 0.25 dpt, i.e. the lines are umbilical or quasi-umbilical lines.

Binocular vision, especially, in the region of the additional channels of vision can further be improved by ensuring that the rays of vision run through regions with the same optical characteristics when converging to see.

Advantageous embodiments of the invented lead to balanced surface characteristics regarding the various aberrations such as surface astigmatism, total astigmatism under the influence of astigmatism of oblique bundles, distortion, etc. are predetermined. Moreover, the equations have the advantage that they permit calculating a composite surface along vertical or nearly vertical lines without having any points of discontinuity.

In many cases a satisfactory acceptance is already yielded if a surface with a total of two additional channels of vision and a plane main meridian is employed.

BRIEF DESCRIPTION OF THE DRAWING

The present invention is made more apparent in the following using a preferred embodiment with reference to the attached drawing depicting.

DESCRIPTION OF PREFERRED EMBODIMENTS

Figure 1A:
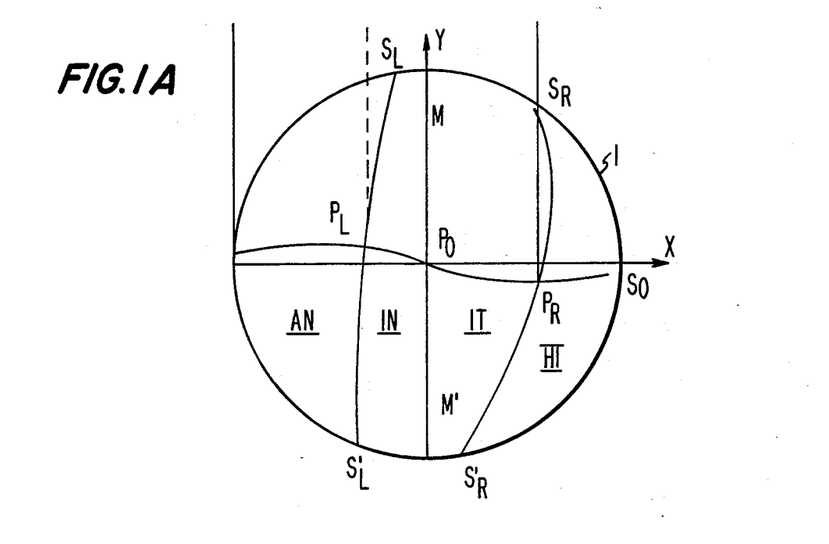
FIG. 1a schematically shows top view of an invented ophthalmic lens, in which the different channels of vision running in an approximately vertical direction are marked.

FIG. 1a shows a top view of an invented "tube-round" ophthalmic lens, i.e. an ophthalmic lens prior to being ground for mounting in spectacle frames, having a convex progressive power front surface. The surface facing the eye may be a spherical, aspherical toric or atoric surface. Furthermore, the ophthalmic lens may be provided with a thickness reducing prism, as is the state of the art in progressive power ophthalmic lenses.

The progressive power front surface of the invented ophthalmic lens is provided on each side of the main meridian MM' with a line $S_R S'_R$ or $S_L S'_L$ respectively, which does not intersect the main meridian MM' and on which the surface astigmatism has a minimum local value. Both these lines as well as the main meridian divide the progressive power surface into four areas, namely an inner nasal region IN, an inner temporal region IT, an outer nasal region AN and an outer temporal region AT. In addition, the x/y coordinate system used hereafter is marked in FIG. 1a.

Figure 1B:
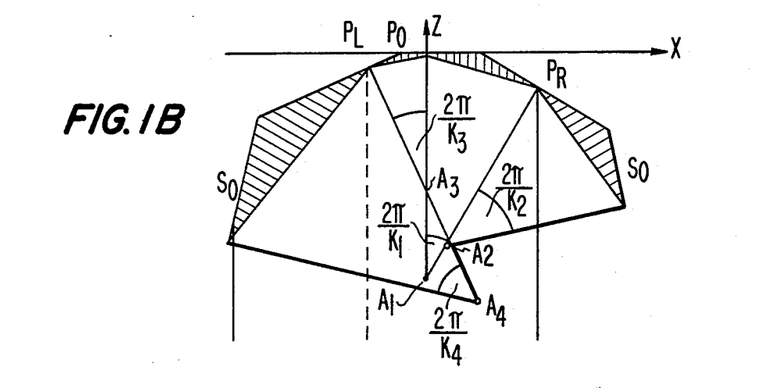
FIGS. 1b and c schematically show the position of the cylinder axes for a surface with four different surface areas, FIGS. 2a and b, show a table of the radii of curvature in horizontal intersections running parallel to one for a numeric preferred embodiment, FIGS. 3a and b show a table of the sagitta of the preferred embodiment according to FIG. 2.
Figure 1C:
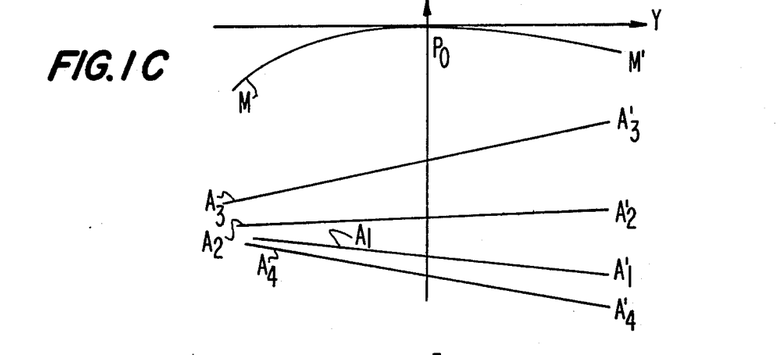

The individual surface areas IN, IT, AN and AT of the illustrated preferred embodiment may be described in a respective cylinder coordinate system, whereby the cylinder axes $A_i A'_i$ ($i=1, \ldots 4$) of the coordinate systems assigned to the individual surface areas are generally skew to one another. FIGS. 1b and 1c show the positions of the cylinder axes $A_i A'_i$.

It is expressly pointed out that FIG. 1b does not show a horizontal intersection, but rather that this figure is to be seen spatially: the position of the points on the ophthalmic lens marked in FIG. 1b can be see in FIG. 1a.

Each of the four surface areas (i) relating to the cylinder coordinate system $(Y_i, \rho_i, h_i)$ assigned to the respective area meets the following equation:

$$\rho_i(\Phi_i, y_i) = f_i(y_i) + g_i(y_i)/k_i 2 * (1 - \cos k_i(\Phi_i - \Phi_{io})) +$$
$$h_i(y_i)/k_i * \sin k_i(\Phi_i - \Phi_{io}) +$$
$$\sum_{n=2} a_{in} * (1 - \cos k_i(\Phi_i - \Phi_{io}))n +$$
$$\sum_{n=1} b_i, 2n + 1 * \sin^{2n+1} k_i(\Phi_i - \Phi_{io}).$$

with $i = 1,2,3,4$ and $f_i(y_i) = \rho_i (\Phi = \Phi_{io}, y)$ $g_i(y_i) = \delta^2 \rho_i / \delta^2 \Phi_i / \Phi_i = \Phi_{io}$ $h_i(y_i) = \delta \rho_i / \delta \Phi / \Phi_i = \Phi_{io}$ Furthermore, the region, within which function $\rho$ ($\Phi y$) has to run in order to yield a convex surface without reversal of curvature, is shown cross-hatched in FIG. 1b.

The individual surface areas of the preferred embodiment illustrated in FIGS. 1a to 1c have different numbers of periods $k_i$ as well as different cylinder axes $A_i, A'_i$. By this means, lateral channels of vision are attained, which are turned and shifted against each other corresponding to the movement of the eyeball in such a manner that excellent binocular vision characteristics are yielded.

An asymmetry of the position of the individual channels of vision can, however, already be attained by forming the overall surface by means of compounding two surface areas which, being twice continuously differentiable, abut along the central umbilical or quasi-umbilical line. If both surface areas to the same cylinder coordinates, the asymmetry may be attained by means of various k-values.

It is expressly pointed out that the description of the surface by means of cylinder coordinate systems is not a required means of describing the surface, but rather simply an advantageous one selected for the illustrated preferred embodiment. The surface or surfaces designed in accordance with the present invention may, of course, also be calculated by other means, by way of illustration using spline functions.

A further embodiment of the present invention is depicted numerically in FIGS. 2a or 2b. In this preferred embodiment, the cylinder axes $A_1 A'_1$ and $A_2 A'_2$ or $A_3 A'_3$ and $A_4 A'_4$ coincide. Furthermore, the main meridian MM' and the lateral channel of vision are umbilical lines, i.e. the surface astigmatism along these lines is zero by calculation.

Figure 3B:
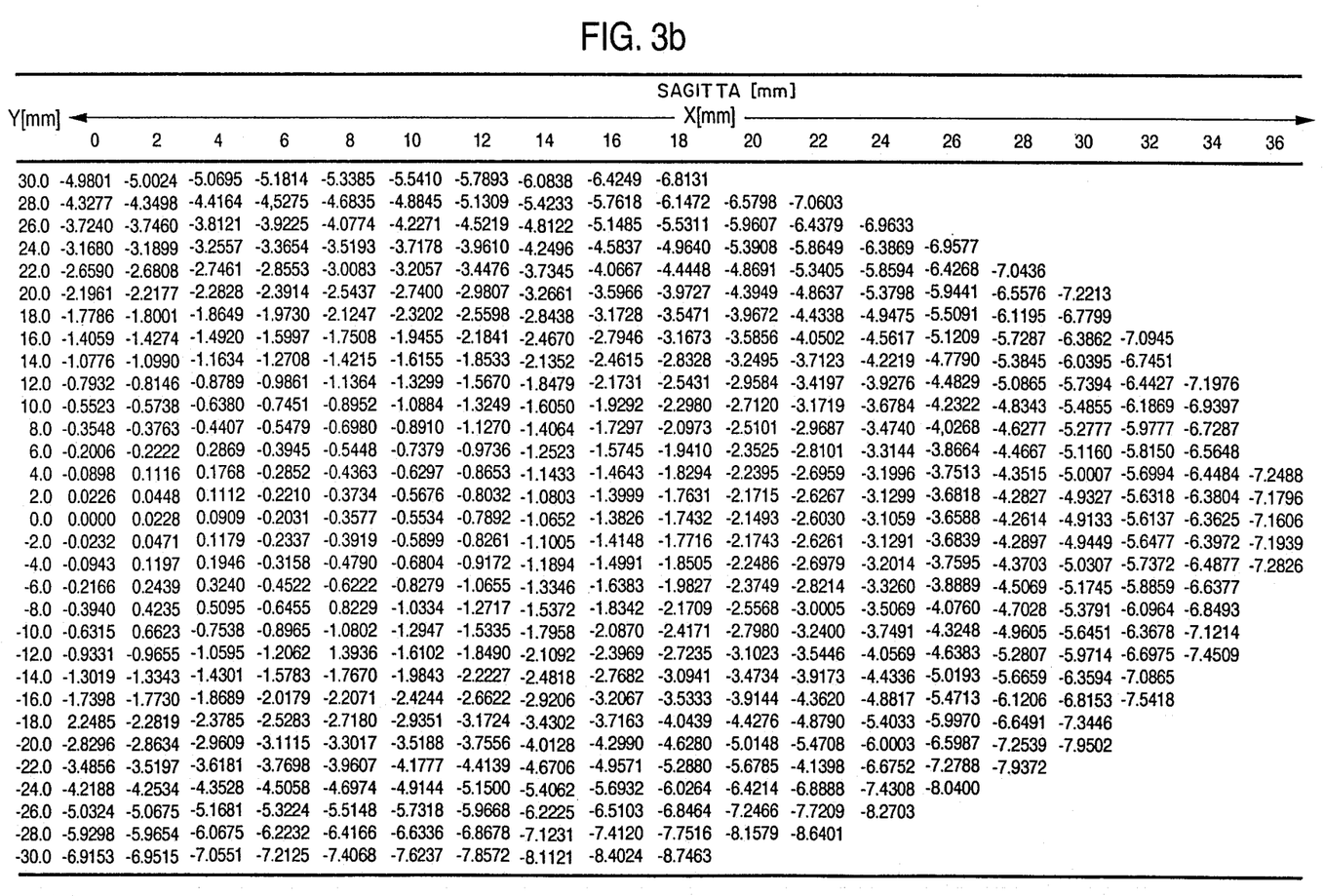

The table in FIG. 2a shows the radii of curvature of horizontal intersections, i.e. of intersections of the surface with horizontal planes for the region on the "nasal side" of the main meridian, whereas the table in FIG. 2b shows the radii of curvature for horizontal intersections for the region on the "temporal side". In addition, the "nasal" (nose side) and "temporal" (temple side) sagitta, i.e. the distance of the surface from one plane touching the apex of the surface, for this preferred embodiment are given in FIG. 3a or FIG. 3b.

Figure 4:
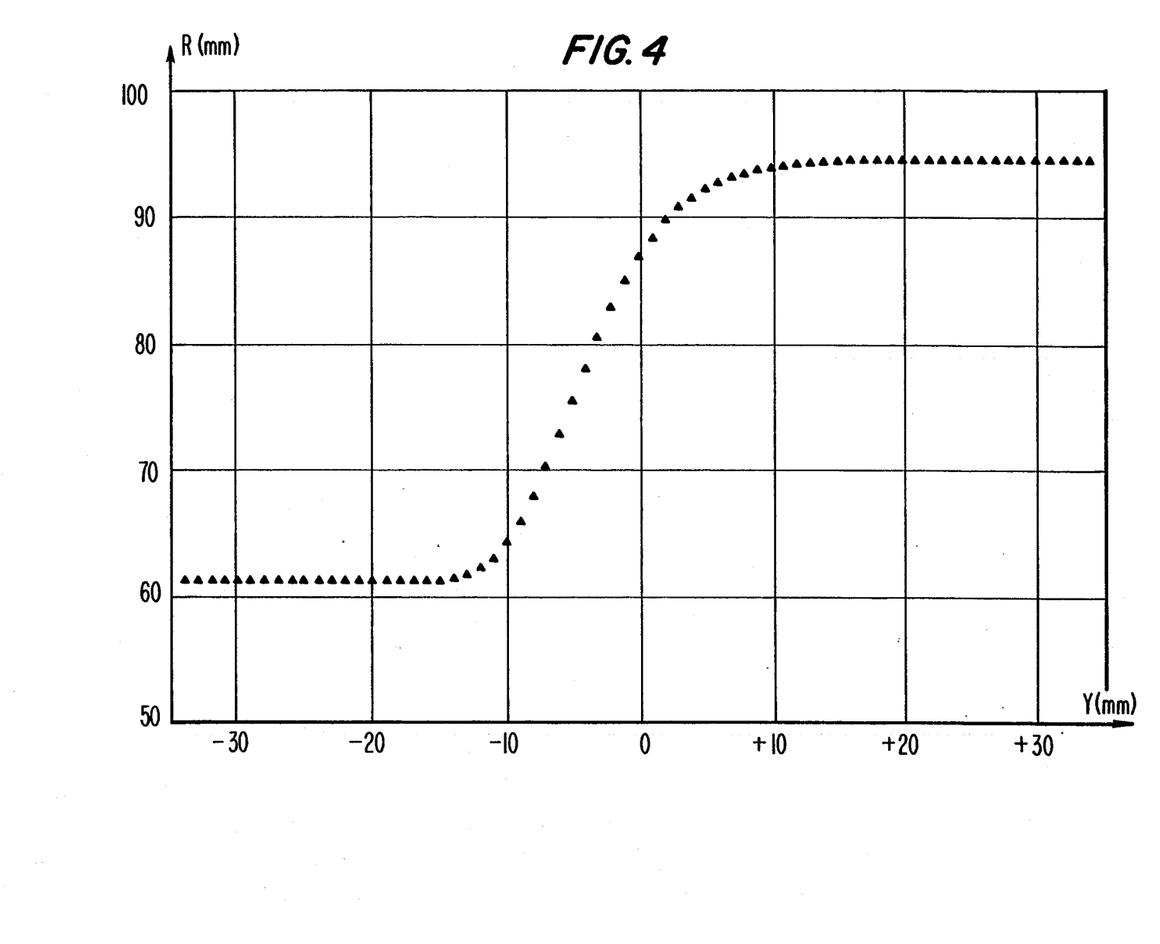
FIG. 4 shows the main meridian of the preferred embodiment according to FIG. 2.

FIG. 4 depicts the course of the radii of curvature of the main meridian of this preferred embodiment. As can be seen, the effect is constant in the distant portion FT and in the near portion NT - in a prior art manner - and increase in the progression zone PZ from the distant portion surface refractive power (5 dpt) of the near portion surface refractive power (8 dpt).

Figure 5:
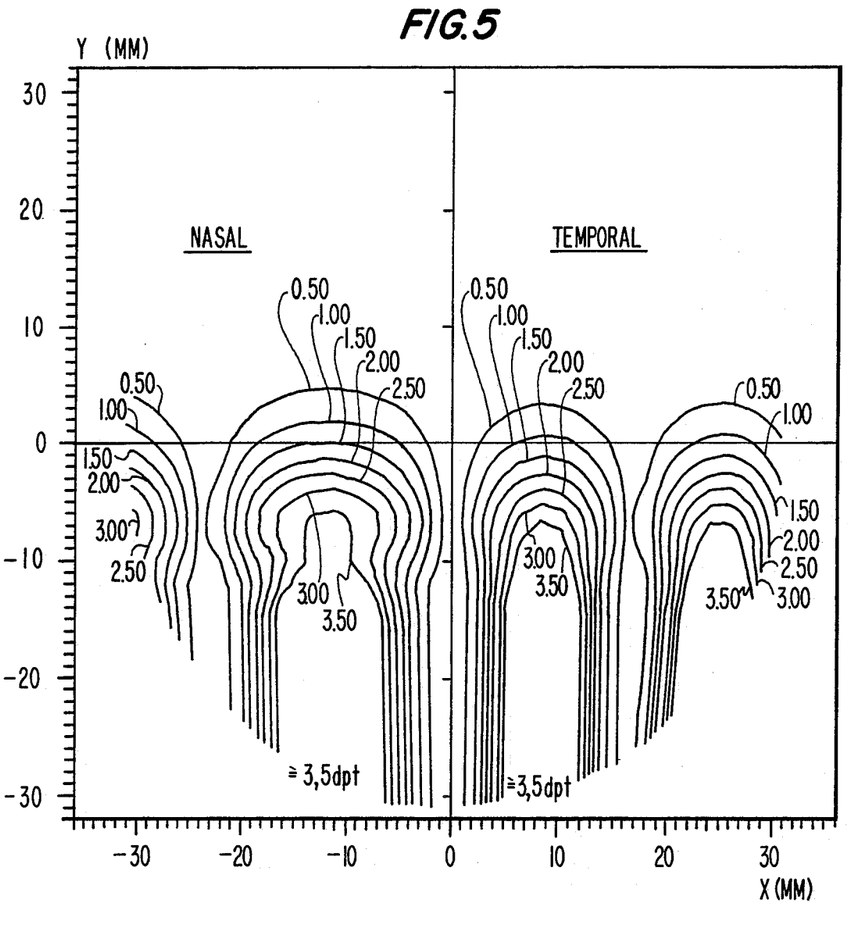
FIG. 5 shows the surface astigmatism of the preferred embodiment according to FIGS. 2a or b.

FIG. 5 depicts the course of the surface astigmatism for the surface areas shown numerically in FIGS. 2a or 2b. As is apparent from FIG. 5, the distance of the nasal channel of vision from the main meridian is greater than the distance of the temporal channel of vision, so that when one glances sideways, both rays of vision run through the respective channel of vision and unencumbered binocular vision is made possible. Moreover, as can be seen in FIG. 5, the lateral channels of vision, i.e. the regions, in which the surface astigmatism is typically 0.5 dpt, are comparatively as large as the actual central channel of vision, i.e. the progression zone and the near portion. All told the surface of the regions suitable for distant vision, i.e. of regions, whose surface astigmatism is $\leq 0.5$ dpt, is substantially larger than in an ophthalmic lens, in which the calculation is optimized to a wide as possible progression zone and a large as possible near portion. Furthermore, the large distant portion is remarkable, into which the central progression zone and the lateral channels open.

In the preceding, the present invention has been described using preferred embodiments by way of illustration only without any intention of limiting or restricting the scope of the present invention - to create, in addition to the main meridian, further channels of vision running approximately in a vertical direction. Of course, there are many very different modifications and alterations possible within the inventive scope other than the illustrated preferred embodiments:

By way of illustration, the main meridian and/or the lateral channels of vision may not only be umbilical lines; a certain surface astigmatism may also occur along these lines. This surface astigmatism may reach a value of up to 0.5 dpt, preferably up to 0.25 dpt. Furthermore, the surface astigmatism occuring in the region designed for distant vision may be dimensioned in such a manner that it completely compensates or partially compensates for the astigmatism of oblique bundles.

Moreover, the main meridian and/or the lateral channels of vision may be not only plane or nearly plane curves, the main meridian and/or channels of vision may also be winding curves in such a manner that its course follows the line of fixation when the eyeball moves up and down.

The preceding inventive reflections, of course, also hold for an ophthalmic lens, in which the surface facing the eye or both surfaces are designed to change refractive power progressively.

Moreover, the description in a cylinder coordinate system is also not required for calculating the surfaces, other calculating methods - by way of illustration spline functions - may be employed. It is expressly pointed out that the relations given in the claims do not only permit a comparatively simple calculation of the surface, but rather a balanced surface with excellent properties is ensured by means of the used relations.

What is claimed is:

1. A progressive power ophthalmic lens having a convex front surface and a concave inner surface with at least one surface contributing to an increase in refractive power from a distant vision portion via a progression zone to a near vision portion along a plane or curved main meridian along which the overall astigmatism is <0.5 dpt, the at least one surface contributing to an increase in refractive power being provided with at least one additional line not intersecting the main meridian and extending from the distant vision portion to a bottom edge of the ophthalmic lens and on which the surface astigmatism has a minimum local value of $\leq 0.5$ dpt so as to form at least one additional channel of vision.

2. An ophthalmic lens according to claim 1, wherein a plurality of additional lines are provided and a plurality of additional channels of vision are formed.

3. An ophthalmic lens according to claim 1 or 2, wherein the at least one additional line is provided on at least one of the nasal side and on the temporal side.

4. An ophthalmic lens according to claim 1 or 2, wherein at least one of the main meridian and the at least one additional line is one of an umbilical line and a quasi-umbilical line.

5. An ophthalmic lens according to claim 1, wherein the at least one additional line has a surface astigmatism with a minimum local value of $\leq 0.25$ dpt.

6. An ophthalmic lens according to claim 2, wherein in an ophthalmic lens in "use position" the additional lines run in relation to the main meridian in such a manner that in binocular vision, the penetrating points of vision corresponding to each other have at least approximately the same characteristics with respect to at least one of refractive value, surface astigmatism, and prismatic effect.

7. An ophthalmic lens according to claim 1 or 2, wherein the at least one surface contributing to the increase in refractive power is provided with $(r+2)$ surface sections, which are compounded twice continuously differentially along r additional lines, and that each surface section meets the following equation in a cylinder coordinate system $(Y_i, \_i, b_i)$ assigned to it:

$$\rho_i(\Phi_i, y_i) = f_i(y_i) + g_i(y_i)/k_i 2 * (1 - \cos k_i(\Phi_i - \Phi_{io})) +$$
$$h_i(y_i)/k_i * \sin k_i(\Phi_i - \Phi_{io}) +$$
$$\sum_{n=2} a_{in} * (1 - \cos k_i(\Phi_i - \Phi_{io}))n +$$
$$\sum_{n=1} b_i, 2n + 1 * \sin^{2n+1} k_i(\Phi_i - \Phi_{io}).$$

with $i = 1,2,3,4$ and $f_i(y_i) = \rho_i (\Phi = \Phi_{io}, y)$ $g_i(y_i) = \delta^2 \rho_i / \delta^2 \Phi_i / \Phi_i = \Phi_{io}$ $h_i(y_i) = \delta \rho_i / \delta \Phi / \Phi_i = \Phi_{io}$ 8. An ophthalmic lens according to claim 7, wherein $r=2$.

9. An ophthalmic lens according to claim 7, wherein each said surface section is related to the same cylinder coordinate.

10. An ophthalmic lens according to claim 7, wherein the main meridian is planar.

11. An ophthalmic lens according to claim 10, wherein the cylinder axes lie in the plane of the main meridian.

* * * * *